May 8, 1934. A. A. HORTON 1,957,501
METHOD AND MEANS FOR OBTAINING TRUE NEGATIVE TOTALS
Filed March 2, 1931 8 Sheets-Sheet 1

INVENTOR
Allen A. Horton
BY Rector, Hibben, Davis & Macauley
ATTORNEYS

May 8, 1934.  A. A. HORTON  1,957,501
METHOD AND MEANS FOR OBTAINING TRUE NEGATIVE TOTALS
Filed March 2, 1931  8 Sheets-Sheet 4

May 8, 1934.  A. A. HORTON  1,957,501
METHOD AND MEANS FOR OBTAINING TRUE NEGATIVE TOTALS
Filed March 2, 1931   8 Sheets-Sheet 5
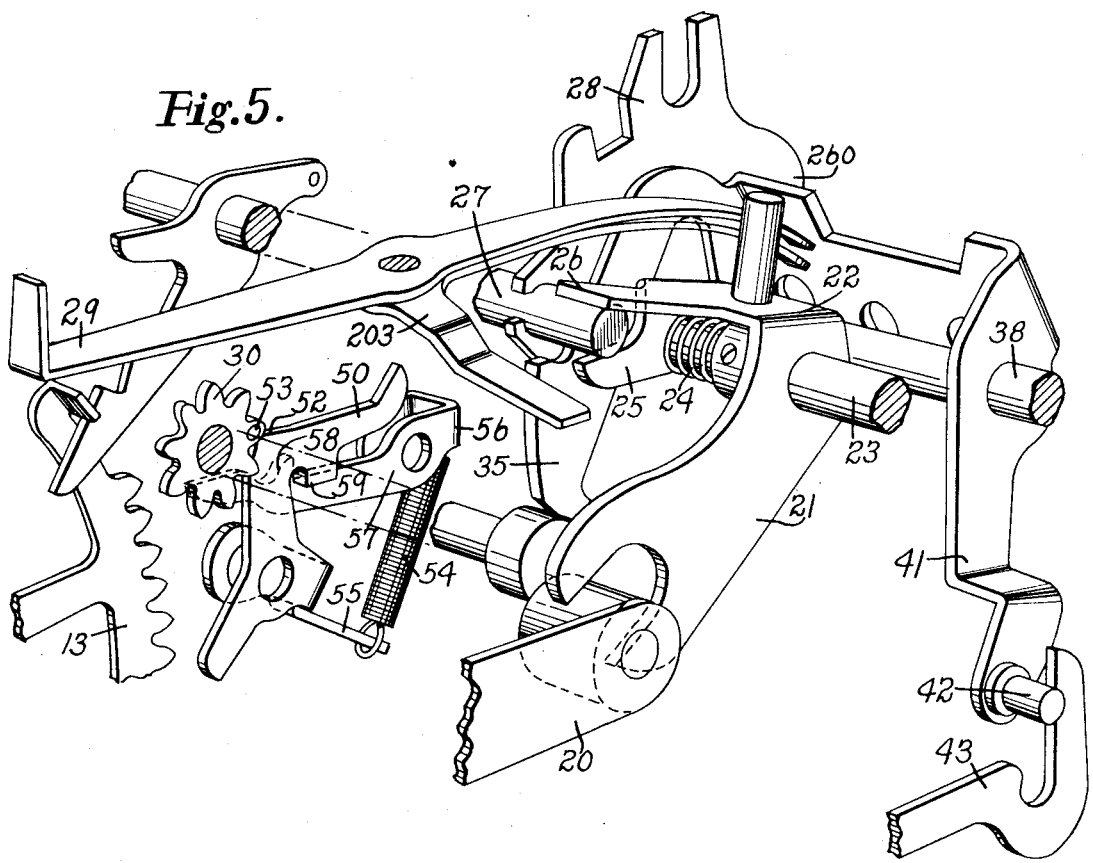
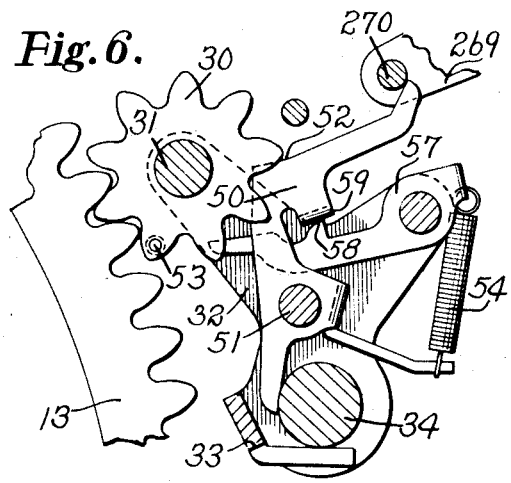
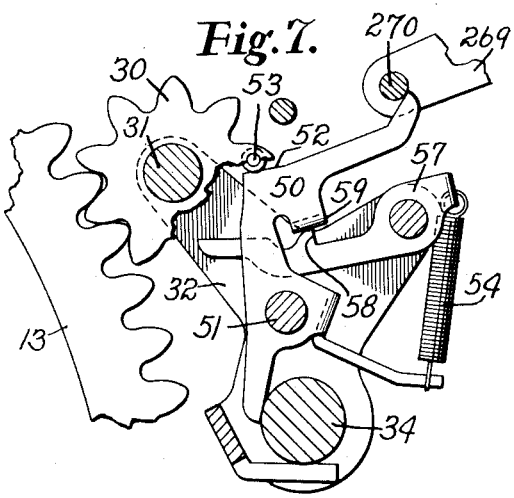
INVENTOR —
Allen A. Horton
BY
Rector, Hibben, Davis, & Macauly
ATTORNEYS

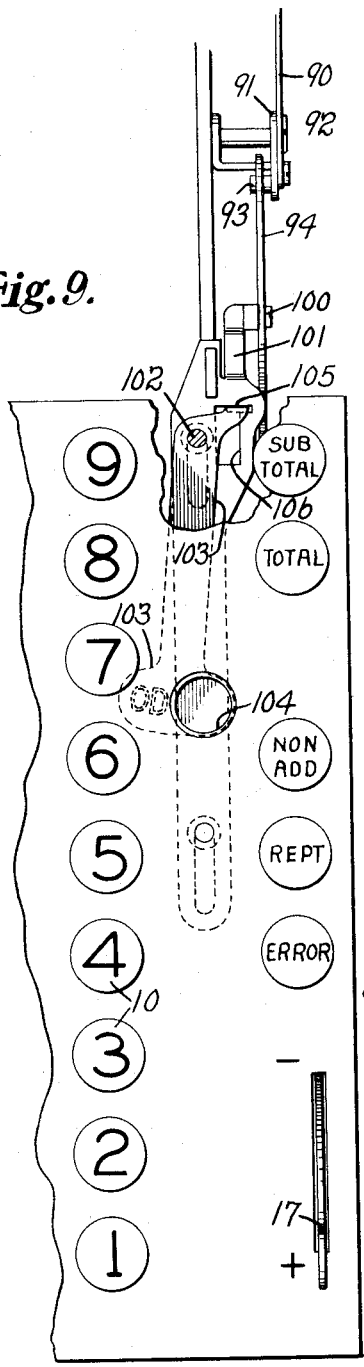
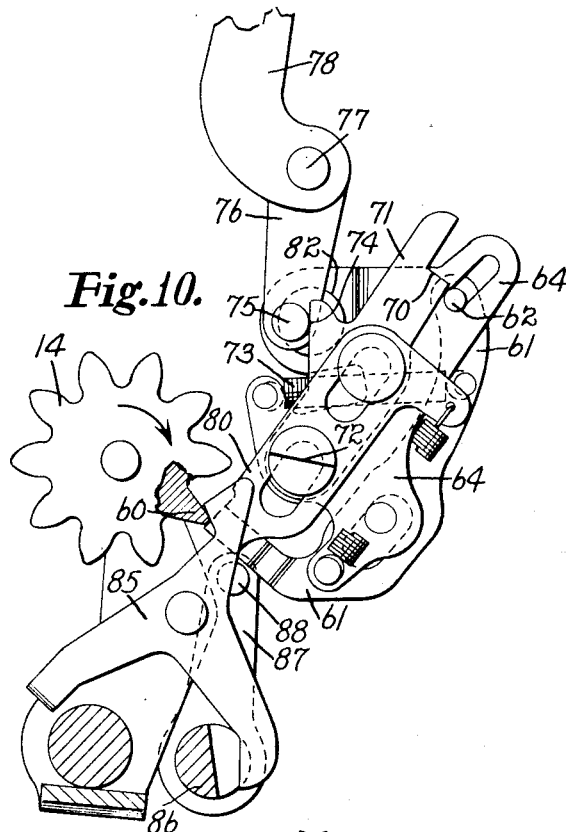
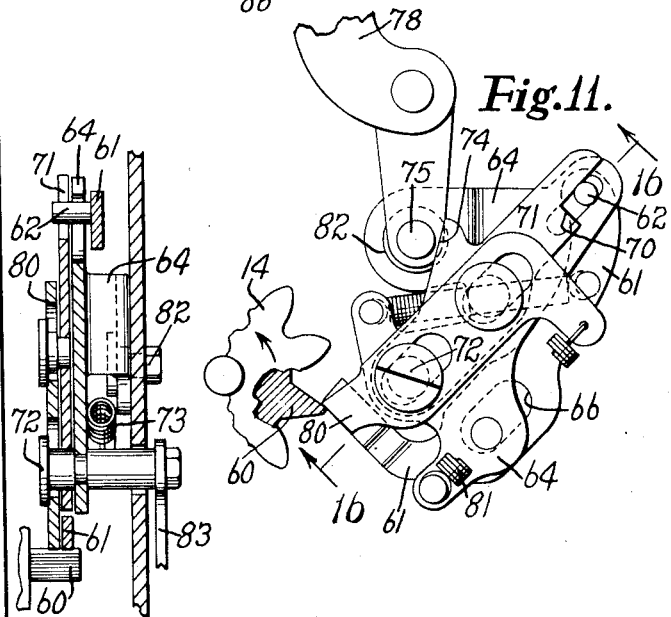

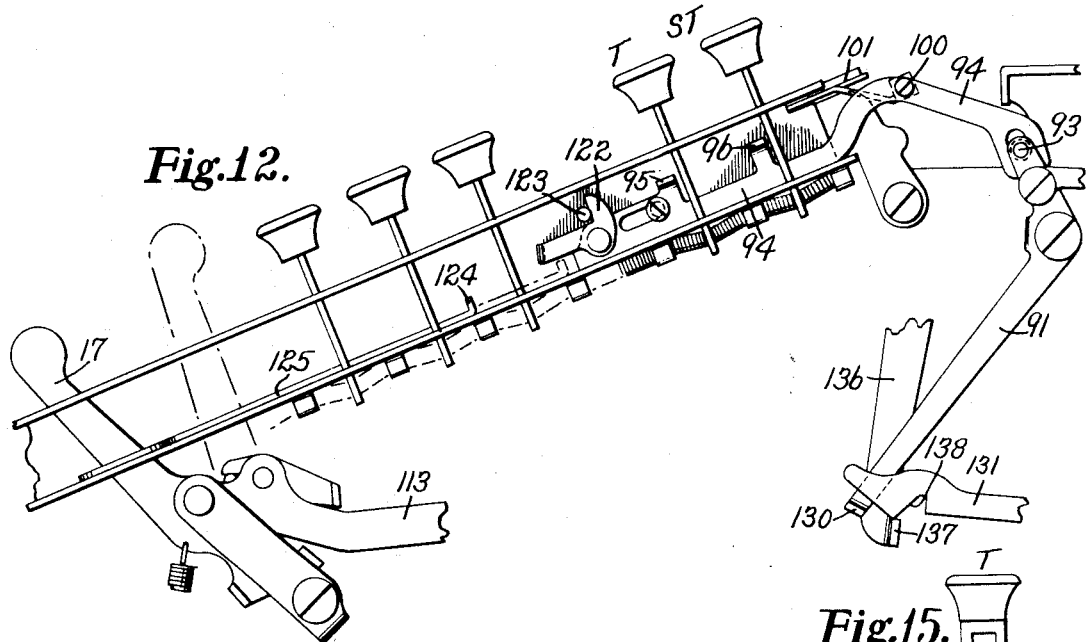
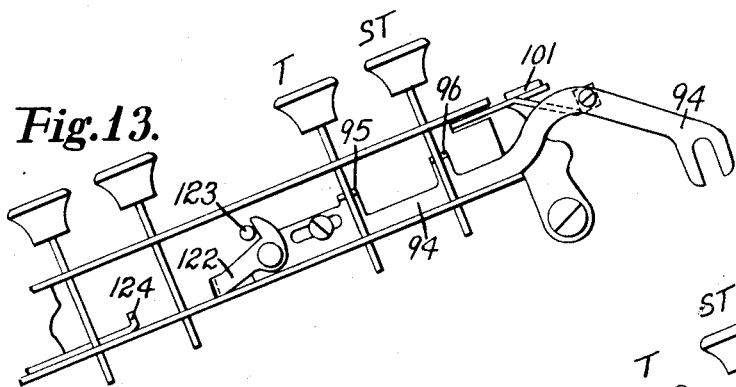
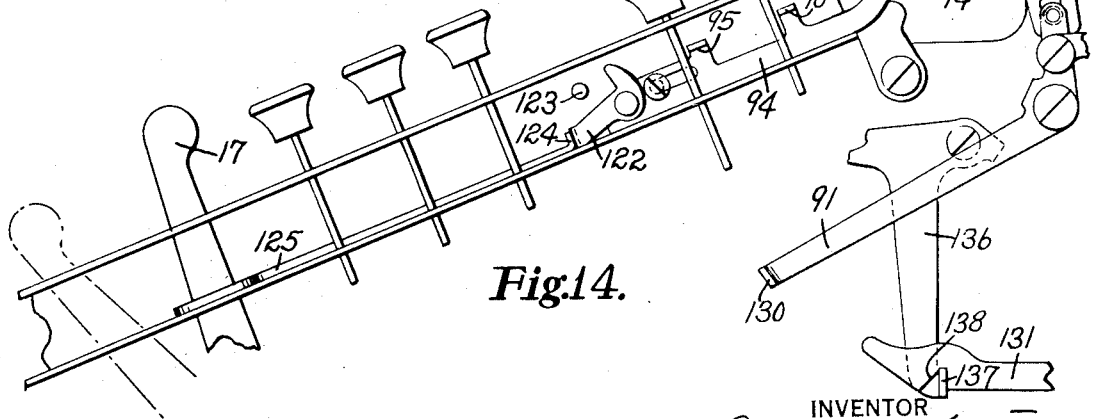

Patented May 8, 1934

1,957,501

UNITED STATES PATENT OFFICE 1,957,501

METHOD AND MEANS FOR OBTAINING TRUE NEGATIVE TOTALS

Allen A. Horton, deceased, late of Detroit, Mich., by Kathleen H. Horton, Plymouth, Mich., and Detroit Trust Company, successor to Detroit & Security Trust Company, Detroit, Mich., executors, assignors to Burroughs Adding Machine Company, Detroit, Mich., a corporation of Michigan Application March 2, 1931, Serial No. 519,610

17 Claims. (Cl. 235—60)

This invention relates to a method and means for obtaining true negative totals in calculations where a greater number is subtracted from a smaller one.

When the register of a calculating machine is put in "negative" or "overdraft" condition by subtracting a larger number from a smaller, or by subtracting a number from the register when it is clear, the register does not show the true negative total but the complement of the total. In some machines, this complement is printed and the operator is depended upon to figure out the true negative total, but it is much more desirable to be able to print the true negative total and to do so with a minimum number of operations. Various constructions have been devised with this object in view and, included in these, are a number in which the complement of the total is transferred from the register in which it occurs to other registers until the true negative total can be obtained. For example, in one machine, the complement is transferred to a portion of the machine, it is then subtracted from a register which is clear, and a total is then taken from the latter register. The difficulty with such a construction is, that it requires three different operations and it requires that one of the registers be clear so that it can be used for obtaining the negative total.

The present invention involves an entirely new method and means for obtaining the true negative total from a calculating machine and it comprehends the use of a special negative total mechanism or register to which the complement in the register that moves to "negative" condition may be transferred and the true negative total obtained immediately from the negative total mechanism.

The general object of the invention is to provide an improved method and means for obtaining a true negative total.

A more particular object is to provide a machine in which a true negative total can be easily and accurately obtained without disturbing any of the regular registers of the machine.

Other objects and advantages will appear from the following specification and drawings.

An embodiment of the invention is shown in the accompanying drawings in which;

Fig. 5 is a partial perspective showing the "overdraft" register and some of the controls associated therewith, the parts being in normal condition.

Fig. 6 is a detail side elevation and section showing the "overdraft register" with the parts in the position they occupy when an "overdraft" has occurred and during the transfer of the complement of the overdraft to the overdraft register.

Fig. 7 is a view similar to Fig. 6 showing the parts in the position they occupy when the overdraft register has been cleared.

Fig. 9 is a partial plan view of the keyboard showing particularly the overdraft signal, the parts being in normal position.

Fig. 10 is a detail view of a portion of the overdraft lock showing the parts in the position they occupy when the register is moving the lock to locking condition.

Fig. 11 is a detail view similar to Fig. 10 showing the parts in the position they occupy when the register is returning the overdraft lock mechanism to normal when an added amount cancels the overdraft.

Fig. 12 is a partial side elevation showing the portion of the overdraft lock mechanism associated with the total key, the parts being in normal position.

Fig. 13 is a view similar to Fig. 12 with the parts shown in position to block the total key against full depression.

Fig. 14 is a view similar to Fig. 12 with the parts in the position they occupy after they have been released by movement of the subtraction lever.

Fig. 15 is a detail view on the line 15—15 of Fig. 12 showing the portion of the overdraft lock associated with the total key.

Fig. 16 is a section on the line 16—16 of Fig. 11.

The invention is shown applied to a Burroughs portable calculating machine of the type shown in Horton 1,853,050. An understanding of the details of the machine is not necessary for an understanding of the present invention and hence the machine will be described only generally. It is to be understood that, while the invention is shown associated with a particular calculating machine, it may also be used with calculating machines of other types and makes.

General construction of calculating machine

Figure 4:
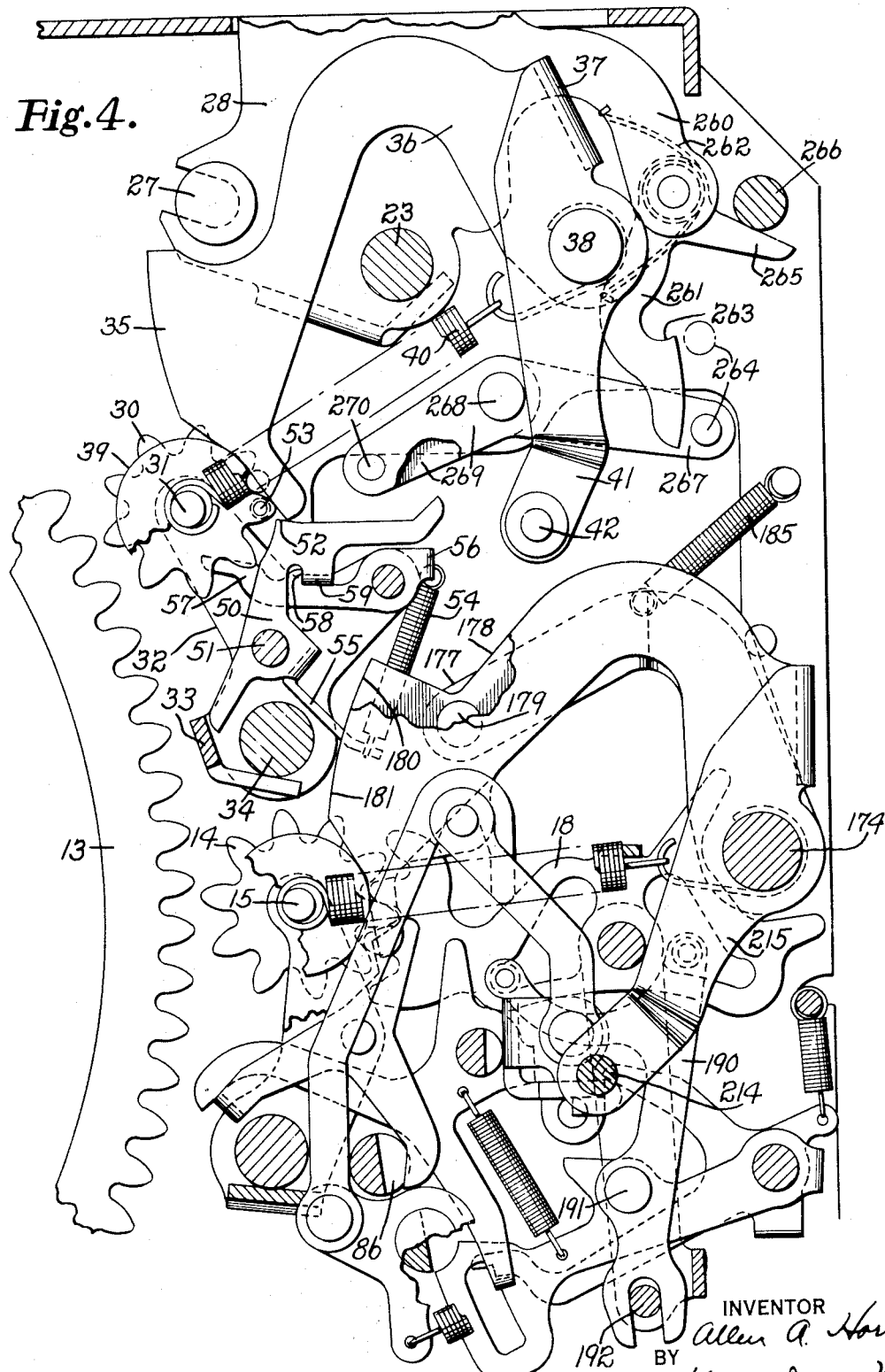
Fig. 4 is a partial side elevation and section with some of the parts removed showing the registers employed in the machine together with some of the controls therefor.

The machine, which is of the key set type, includes a plurality of amount keys 10 (Fig. 1) which are depressed for the entry of an item. After the keys have been depressed the main drive shaft 11 is given a stroke of operation in a counter-clockwise direction by a motor, or by the handle 12 shown in dot and dash lines in Fig. 1, after which the shaft is released and it is returned by springs in a clockwise direction to its normal position. During the counter-clockwise or forward stroke of the machine a series of actuator racks 13, of which one is shown in Fig. 4, are raised to differential positions determined by the amount keys that have been depressed and, upon the clockwise or return stroke, these actuator racks are restored to normal.

Associated with the actuator racks is a register 14 (Fig. 4) comprising a series of toothed pinions mounted on a shaft 15. For convenience this register will be called the "regular" or "calculating" register. This register is moved into and out of engagement with the actuator racks at the appropriate time to enable items to be added, subtracted, or totaled, the engagement of the register being effected by a pitman 16 (Fig. 2) which moves back and forth under the control of a series of control keys such as the "subtotal", "total", and "non-add" keys shown at the right hand side of Fig. 9, and also under the control of a subtraction lever 17. Accompanying the register 14, as shown in Fig. 4, is a transfer mechanism including transfer segments 18. This transfer mechanism is automatically conditioned to either carry or borrow under the control of the subtraction lever 17 and is described in detail in Patent No. 1,767,674.

Associated with the actuator racks 13 are a series of printing type bars 19 (Fig. 1) for printing the items entered and the totals taken from the machine. This printing mechanism has not been shown or described in detail as it is fully disclosed in Patent No. 1,730,147.

It should be noted, however, that a non-print control is associated with the printing mechanism for disabling it. This control is best illustrated in Fig. 5. The printing mechanism is operated by means of a lever 20 which is first rocked counterclockwise and then returned clockwise during each operation of the machine. This lever has a stud operating in a slot in the end of an arm 21 of a yoke 22 which is slidably and rotatably mounted on a shaft 23. The yoke is urged to the left as viewed in Fig. 5 by a spring 24 so that a second arm 25 and a lug 26 of yoke 22 are astride a shaft 27 near its end. Shaft 27 is carried by suitable pivoted arms of which one, 28, is shown in Fig. 5. When the yoke 22 is rocked the shaft 27 is rocked and this controls the printing hammers of the printing mechanism as described in detail in Horton Patent No. 1,730,147. The yoke 22 may be moved longitudinally on shaft 23 by means of a hand operated non-print lever 29 and, when this occurs, the arm 25 and lug 26 are moved beyond the end of shaft 27 so that, when yoke 22 is rocked, the shaft 27 will not be rocked and the printing mechanism will not be operated.

Negative total register

When an "overdraft" occurs in the machine, the correct "overdraft" or "negative total" should be printed when a total is taken and this is accomplished through the use of a special negative total mechanism in the form of a register having mechanism associated with it so that a correct negative total can be easily and accurately obtained.

This register is positioned above the regular register 14 and, for convenience, will be called the "negative total" register. It comprises a series of toothed pinions 30 mounted on a shaft 31 but the pinions have only nine teeth in contrast to the ten teeth that are usually found on registers associated with calculating machines. In other words the pinions of the negative total register have a digit capacity of nine as compared with a digit capacity of ten possessed by the regular register. The shaft 31 is carried by the side arms 32 of a yoke 33 fixed to the shaft 34 which is journaled in the side plates of the machine. The negative total register is engaged with and disengaged from the actuator racks 13 under the control of a cam plate 35 (Fig. 4) on the end of an arm 36 forming a part of a yoke 37 fixed to a shaft 38. Mounted on the shaft 31 on which is a negative total register pinions are carried is a cam roller 39 which is urged into engagement with the edge of the cam disk 35 by a spring 40. This spring acts to disengage the register from the actuator racks whenever the cam 35 will permit such disengagement. The negative total register is shown in its disengaged position in Fig. 4. It will be evident that, if the cam 35 is rocked counterclockwise from its Fig. 4 position, the edge of the cam will engage the roller 39 and move the register into engagement with the actuator racks. When the cam is returned to its Fig. 4 position, the roller 39 will be released whereupon position, the spring 40 will disengage the register from the actuator racks.

Figure 1:
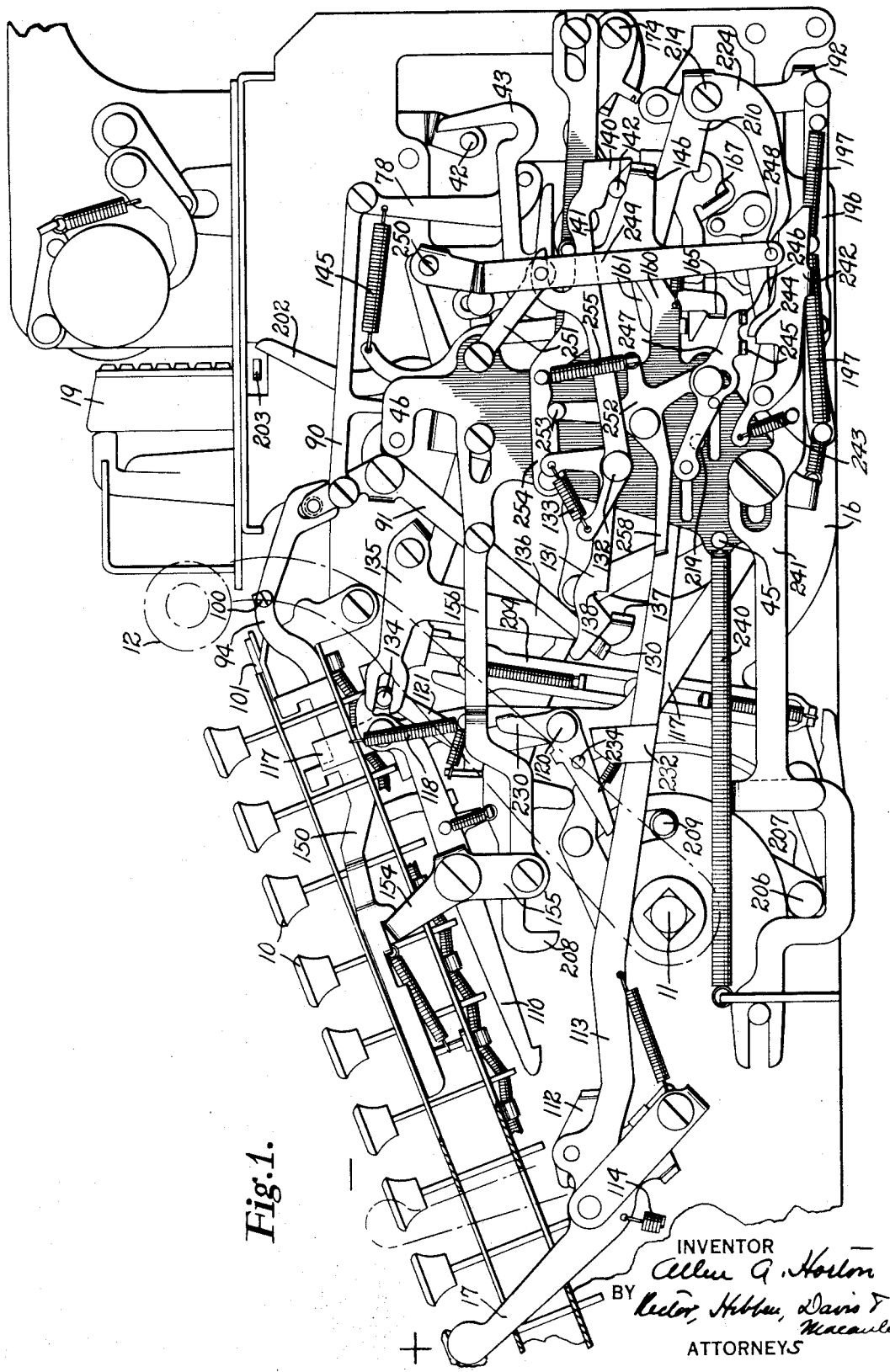
Figure 1 is a right side elevation of a machine with the invention applied thereto, the view being taken with the casing removed to show the controlling mechanism which is in normal "addition" condition.
Figure 2:
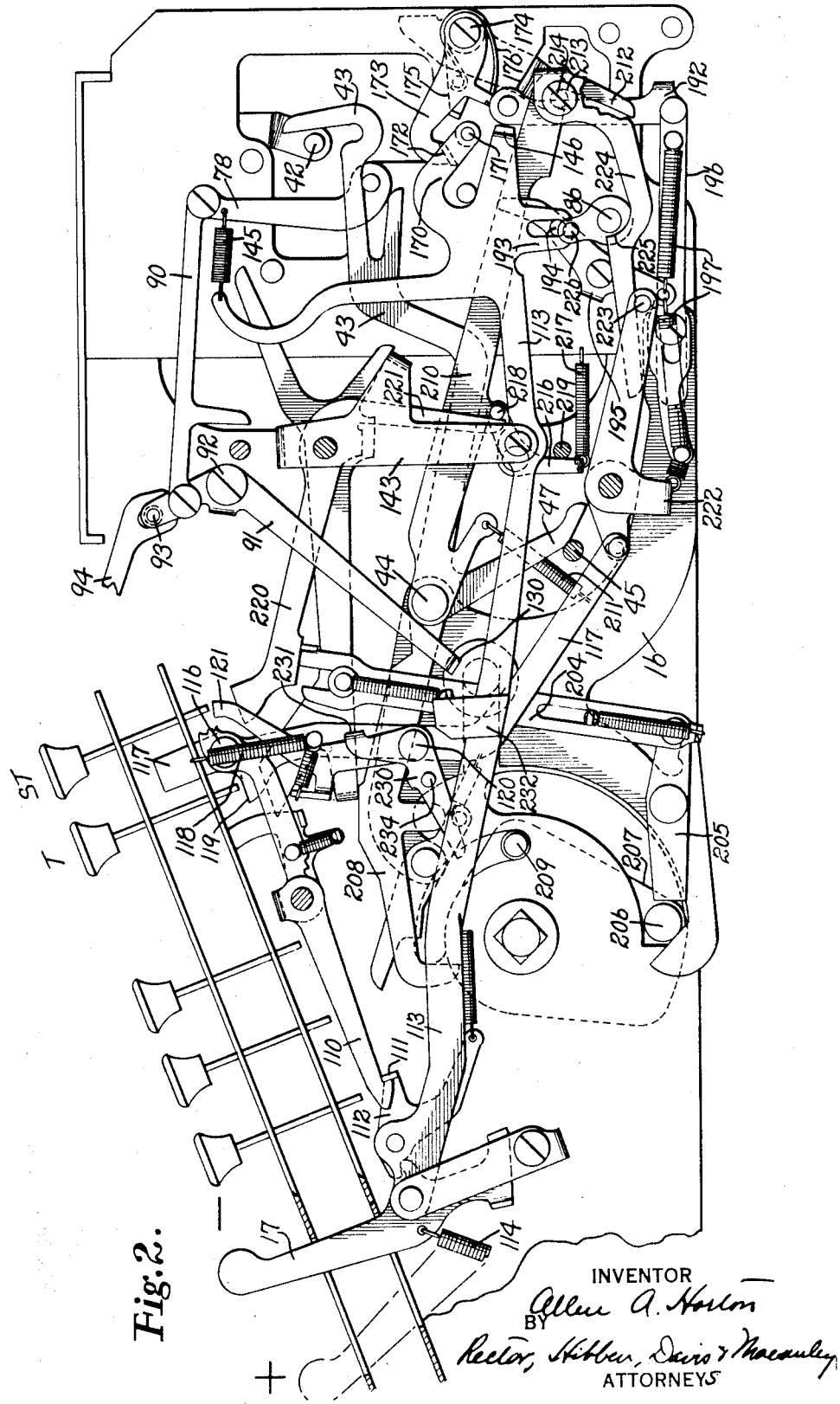
Fig. 2 is a side elevation similar to Fig. 1 with the controls in "subtraction" condition and with some of them omitted to show others more clearly.

The cam 35 is rocked by operation of the machine under the control of certain control devices as follows:

Referring to Fig. 4, the yoke 37 has an arm 41 carrying a stud 42 which, as shown in Fig. 2, is positioned for cooperation with the hooked end of a link 43 which, is pivoted on a stud 44 on the pitman 16 which is reciprocated to control the regular register of the machine. The link 43 moves backward and forward with each movement of the pitman 16 but, with the link in the position shown in Figs. 1 and 2, this movement has no effect on the negative total register because the hooked end of the link is not hooked over stud 42. However, when the link 43 is moved to the position of Fig. 3, the overdraft register is moved when the pitman 16 moves. The link 43 is moved to its Fig. 3 position by means of a stud 45 on a plate 46, which plate, for convenience, will be called the "control plate", the action of which will be later described. The stud 45 is adapted to engage the end of the tail 47 on the forward end of link 43 so that, when the stud 45 is moved rearwardly from its Fig. 2 to its Fig. 3 position, the link 43 is swung upward.

Figure 3:
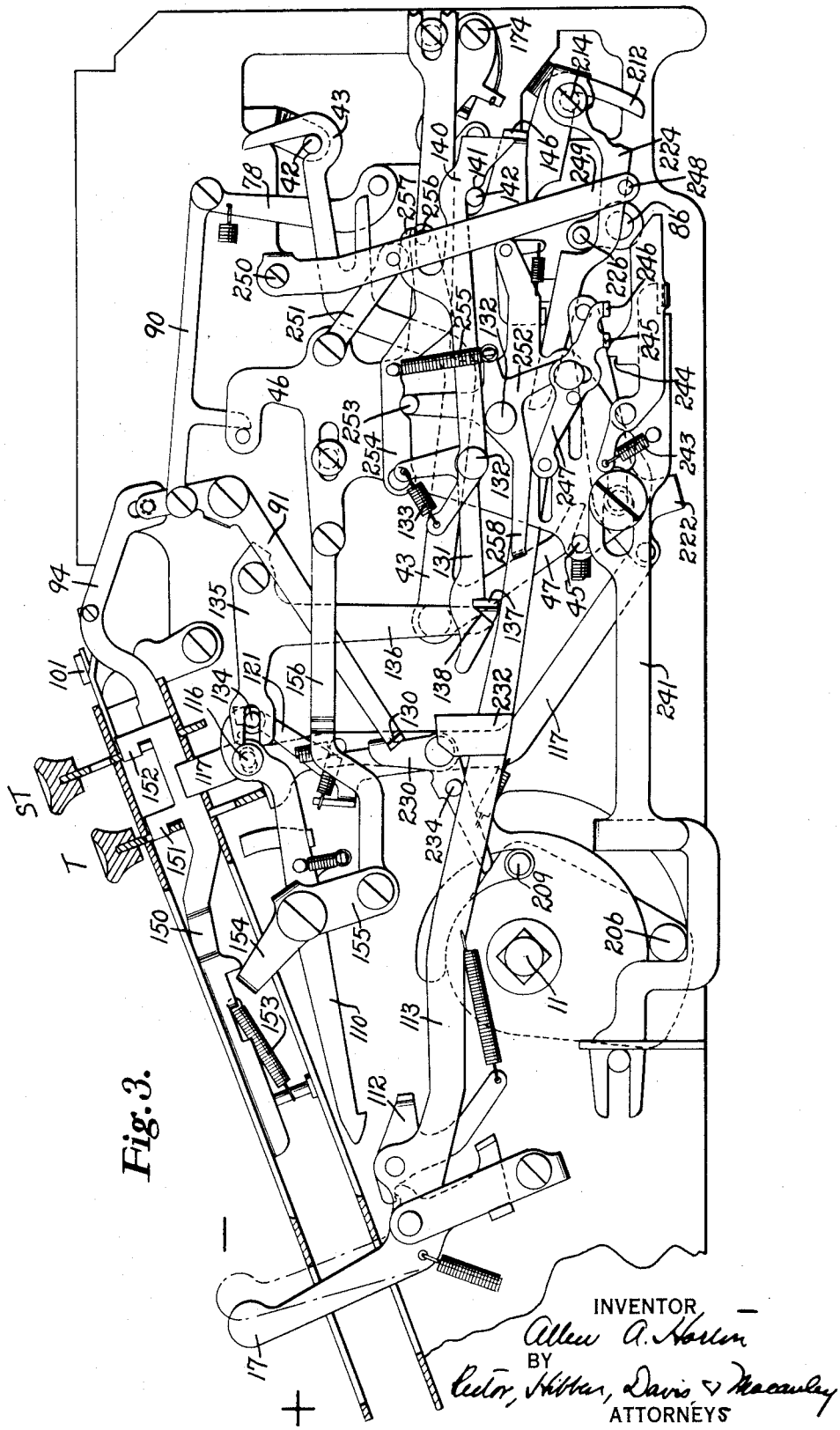
Fig. 3 is another side elevation similar to Fig. 1 showing the parts in the position they occupy when the machine is in "overdraft" condition and the total key depressed to take a total.

With the link 43 in its Fig. 3 position, if the main pitman 16 is moved rearwardly at the beginning of the forward stroke of the machine, as it is in total taking, the negative total register will be rocked into engagement with the actuator racks at the beginning of the forward stroke and, when the main pitman is again moved forward at the beginning of the return stroke, as it is in total taking, the negative total register will be rocked out of engagement with the actuator racks.

The negative total register is not provided with a transfer mechanism but it does have associated with it a series of zero stop pawls 50 (Fig. 4) for arresting the register pinions in "0" position in order that a total may be taken and the register cleared. These pawls are pivoted on a shaft 51 and each is provided with a shoulder 52 adapted to be engaged by a stud 53 on its respective register pinion. Each pawl is urged counterclockwise by a spring 54 associated with it, one end of each spring being connected to a tail piece 55 on the yoke portion of its pawl 50 and the other end being connected to a yoke 56 having a latch arm 57 provided with a shoulder 58 adapted to engage a lug 59 on the respective pawl 50.

Although the pawls 50 are urged counterclockwise as above explained, they are normally latched against such movement by the latches 57 as shown in Fig. 4. When the pawls 50 are latched in this position, their shoulders 52 are out of the paths of the studs 53 on the pinions 30 and the pinions may be rotated clockwise past the pawls without any interference from the shoulders. These pinions 30 are always rotated in one direction in the operation of the machine, that is, in a clockwise direction, as shown in Fig. 4. After the studs 53 have passed the shoulders 52, the studs engage the tails of the latches 57 and trip the latches whereupon the pawls 50 are moved counterclockwise by their springs 54 to positions such that their shoulders 52 will be in the path of studs 53 if the pinions 30 continue their rotation for nine steps in a clockwise direction from their Fig. 4 position.

It will be apparent therefore that, initially, all pinions of the negative total register may be rotated in a clockwise direction but, when any one of the pinions moves away from its initial "0" position, it trips a latch which frees a pawl that subsequently acts to block rotation of the pinion after it has moved nine steps from its "0" position.

Before describing in detail the remainder of the mechanism, the manner in which the negative total register is used to obtain a correct negative total will be described.

Assume that an overdraft has occurred in the machine such as would happen, for example, if 888 were subtracted from 777. The pinions of the regular register would then stand at 999999888, the "fugitive 1" having been kicked in as will be described later. With the machine in this condition, a total is taken from the regular register and, at the time this total is taken, the negative total register is engaged with the actuator racks so that the total is transferred to the "negative total" register in a subtraction direction, that is, the pinions are rotated clockwise as viewed in Fig. 4, the registers being engaged with the racks during the upward movement of the latter. This means then that 999999888 is subtracted from the "negative total" register. It will be remembered, however, that the pinions of the negative total register have only nine teeth which, if they were numbered for display, would be numbered from 0 to 8, inclusive. In the transfer of the above number to the "negative total" register, the pinions in the orders where 9 is transferred will move through nine steps, that is, they will be returned to their "0" position. The pinions that are moved eight steps will be moved to within one position of their "0" position, that is, they will be one position removed from normal after they have been moved eight steps. The pinions of the "negative total" register will then stand in the position "000000111". This is the condition of the negative total register after the above described transfer has been made, said operation acting to clear the regular register.

With the machine in this condition a total is now taken from the negative total register. In the taking of this total, the negative total register is engaged with the actuator racks before they are released and their ascent is controlled by the pinions of said negative total register. The movement of the pinions during the transfer of the total from the regular register to the negative total register resulted in releasing the pawls 50 for forward movement to positions where their shoulders 52 are in position to block clockwise movement of the pinions 30 beyond their "0" position. Consequently, the only pinions that can be moved in the example assumed are the pinions in the first three orders which stand in their "111" positions and these pinions can be moved only one step to their "0" positions. Accordingly, only the first three rack bars can move and these will move one step so as to print "111" which is the correct negative total.

The use of a nine tooth pinion register in the manner above described provides a very simple and effective way of getting the correct negative total. As far as known this mechanism and principle of operation are entirely new in negative total taking.

Associated with this mechanism are a number of controls including a negative total lock, an overdraft signal, mechanism for inserting the "fugitive 1" at the appropriate point and other controls which will now be described.

*Operating mechanism for overdraft lock and signal*

When an overdraft occurs in the regular register the pinion of highest order of said register operates a locking mechanism associated with the total and subtotal keys and also displays a signal.

Figure 8:
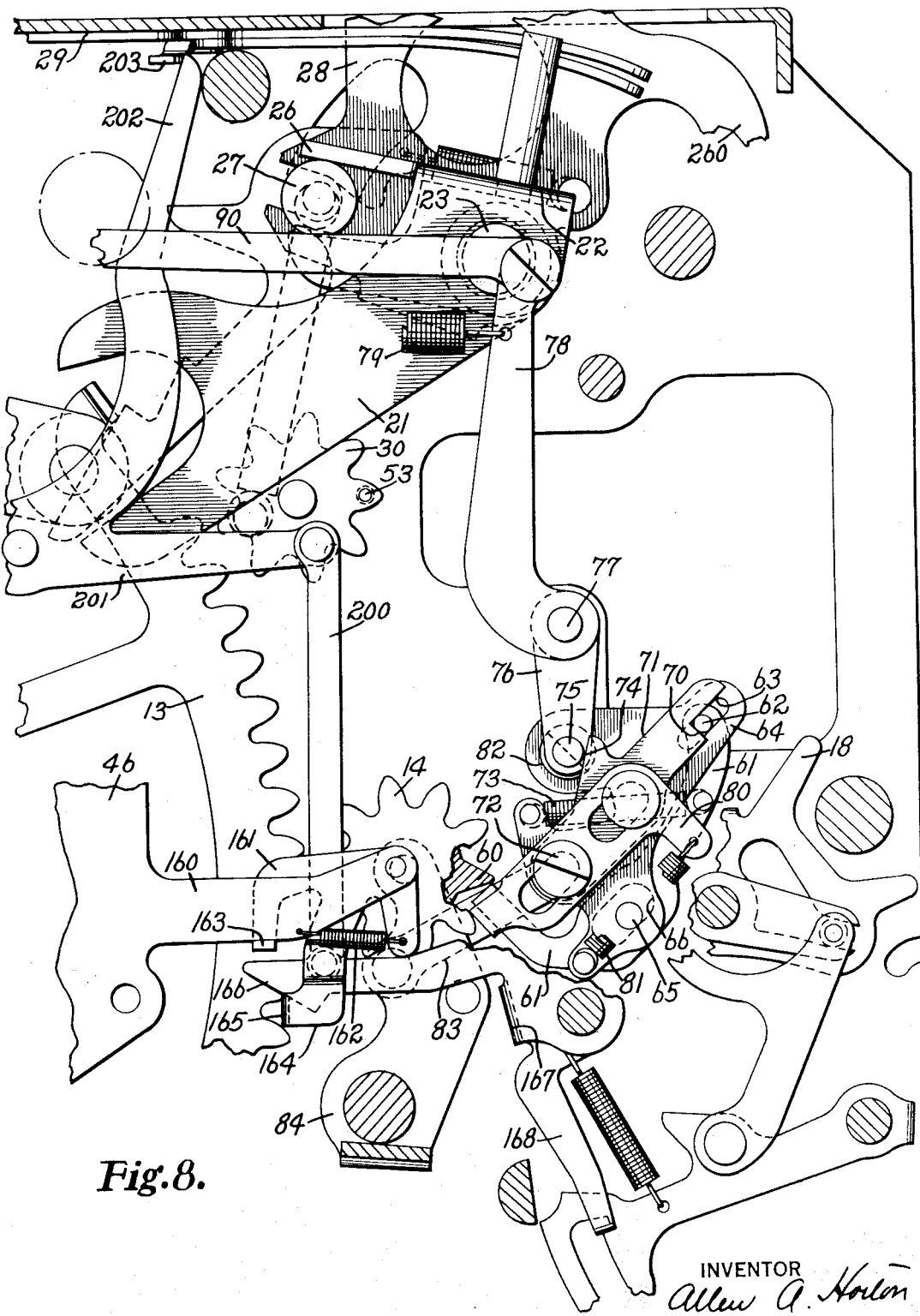
Fig. 8 is a partial side elevation and section of the rear portion of the machine showing particularly the "fugitive 1" mechanism and the overdraft lock.

Referring to Fig. 8, the pinion of highest order of the regular register 14 is provided with a transfer projection similar to those in the pinions of lower orders. said projection being in the nature of a wide faced tooth 60. This tooth is positioned to act on the end of a pawl 61 having a stud 62 on its opposite end positioned in a slot 63 in a plate 64. The plate 64 has a stud 65 operating in a slot 66 in said pawl 61. This mounting of the pawl permits it to slide longitudinally relative to the plate 64 and at the same time it may be rocked about the stud 62 as a pivot. The stud 62 is normally positioned as shown in Fig. 8 against a shoulder 70 on a member 71 pivoted on a stud 72 on plate 64 the pawl 61 carrying stud 62 being urged by a spring 73 to cause the stud 62 to engage shoulder 70. The member 71 has an upward cam-like extension 74 positioned for engagement with the stud 75 on an arm 76 fixed to a shaft 77 which also has fixed to it an upwardly extending arm 78 urged counterclockwise by the spring 79 that controls the negative total and the overdraft signal, as will be later described, it being sufficient for present purposes to know that, when the arm 78 is rocked clockwise against the tension of the spring 79, the overdraft lock is set and the overdraft signal displayed. Mounted on the member 71 by two pin and slot connections is a sliding plate 80 urged to its Fig. 8 position by a spring 81. The operation of the above described mechanism is as follows:

Referring again to Fig. 8, when the pinion 14 of highest order moves clockwise to overdraft position as in Fig. 10, the wide faced tooth 60 engages the end of the pawl 61 and also the end of the plate 80 slidable on the member 71. As the pinion 14 continues to rotate clockwise, as illustrated in Fig. 10, the slidable plate 80, together with the member 71, is rocked counterclockwise about the pivot 72. This rocks the shoulder 70 above the stud 62 (Fig. 10) and allows the pawl 61 to be moved downwardly from its Fig. 8 to its Fig. 10 position by the spring 73. When the member 71 rocks counterclockwise its cam portion 74 engages the stud 75 and rocks the arm 76 clockwise which gives a corresponding rocking movement to arm 78 and sets the overdraft signal together with the overdraft lock.

It is, of course, possible that an overdraft might occur while the register is in engagement with the racks or it might occur when the register is out of engagement with the racks, the overdraft in the latter case being caused by a transfer. It is, therefore, necessary to have the above described mechanism in position for operation by the register no matter what the position of the register may be and, in order that this result may be accomplished, the plate 64 which carries the above mentioned parts, that is, the pawl 61 and the member 71 is pivoted on a stud 82 (Fig. 8) on the machine frame, this stud being in axial alignment with the stud 75 on the end of arm 76. The plate 64 is then connected by a link 83 with one of the side plates 84 of the pivoted frame carrying the register 14. The plate 64 thus moves pivotally about the stud 82 as the register is moved into and out of engagement with the racks which keeps the end of the pawl 61 and the end of the slidable plate 80 in position relative to the register pinion of highest order. Also, the cam portion 74 of member 71 remains in proper position relative to the stud 75 owing to the fact that the plate 64 swings about an axis coincident with the axis of the stud 75 when the stud is in normal position.

If the register should be restored to positive condition by the entry of positive items before a total is taken, the parts are restored by a reverse movement of the pinion 14 of highest order. When this pinion is rotated counterclockwise, its wide faced tooth 60 moves through the Fig. 11 position and beyond, said wide faced pinion engaging the end of the slidable plate 80 and the end of the pawl 61. Continued movement of the wide faced pinion rocks the pawl 61 against the tension of its spring 73, the slot 66 being wide enough to permit a limited movement of pawl 61 relative to stud 65. The pawl 61 is also pushed upward so that the stud 62 passes beyond the shoulder 70. When this occurs, the member 71 is snapped back to its Fig. 11 position by the spring 81 and, as soon as the wide faced pinion passed the ends of the pawl 61 and plate 80, they move back to normal position shown in Fig. 8.

When, during negative total taking, the negative total is transferred to the negative total register, which clears the regular register, the above described mechanism is restored in a different way and as follows:

Referring to Fig. 10, the pinion 14 of highest order is provided with a transfer pawl 85 similar to that provided for the pinions of lower order, said pawls and associated parts being described in detail in said Horton Patent No. 1,767,674. When the machine is conditioned to take a total from the regular register a shaft 86 of semi-circular cross section is rocked clockwise from its Fig. 10 position far enough to block clockwise movement of the pawl 85. The pawl then acts as a limit stop for arresting the pinion 14 in "0" position in total taking, all as described in said Horton patent just mentioned. Fixed to the shaft 86 is a short arm 87 carrying a stud 88 positioned to engage the end of the pawl 61. When the shaft 86 is rocked clockwise as above explained to condition the mechanism for total taking, the arm 87 rocks clockwise and the stud 88 engages the pawl 61 to move it upward until its stud 62 passes the shoulder 70 whereupon the member 71 is snapped back to normal by the spring 81.

Overdraft lock

As previously mentioned, an overdraft lock is operated by the clockwise movement of the arm 78 (Fig. 8) when said arm is moved by an overdraft in the regular register. This overdraft lock will now be described.

Referring to Fig. 2, the arm 78 is connected to one end of a link 90 whose other end is connected to the upper end of a lever 91 pivoted at 92 to the machine side frame. The upper end of this lever carries a stud 93, operating in a slot in the end of a slidable link 94 (Fig. 1) on the keyboard. This link has two upstanding lugs 95 and 96 (Fig. 14) having lateral projections operating in slots in the sides of the total and subtotal key stems respectively (Fig. 15). When the link 94 is pulled to the rear from its normal Fig. 12 position, these projections move to their Fig. 13 positions thereby blocking both the total and subtotal key against complete depression, although allowing partial depression of these keys as will be clear by reference to Fig. 15.

Accordingly, when an overdraft occurs in the regular register the total and subtotal keys are locked against complete depression to positions for taking totals or subtotals but they may be partially depressed.

Overdraft signal

The clockwise movement of arm 78 (Fig. 8) when an overdraft occurs in the regular register also sets an overdraft signal as follows:

Referring to Fig. 9, there is attached to the link 94 at 100 a plate 101 slidably mounted on the keyboard. Pivoted on a stud 102 supported by the keyboard is a signal arm 103 having an overdraft sign "OD" on its end adapted to be swung to a position so as to be visible through an opening 104 in the top of the keyboard. The arm 103 has a rearward extension provided with a downwardly extending lug 105 operating in an L-shaped slot 106 in the slidable member 101. When the link 94 moves rearward the short portion of the L-shaped slot 106 engages the lug 105 on arm 103 and swings the arm counterclockwise so as to display the "OD" sign. As the arm 103 swings, the lug 105 moves out of the short portion of the slot 106 and frees the arm 103 from the slidable member 101 so that the latter may continue its rearward sliding movement. The lug 105 enters the long portion of the slot 106 and the arm 103 is held in the position to which it has been moved.

It will thus be seen that, when an overdraft occurs in the regular register, an overdraft signal is displayed on the keyboard.

Release of overdraft lock

After the overdraft lock has been set it is necessary to release it in order to enable the operator to take a negative total because, in order to take said total, the total key must be depressed and the machine operated. Use is made of the subtraction lever 17 to release the total and subtotal keys.

When an overdraft occurs, it occurs during the subtraction of an item in the machine, in which event the subtraction lever is in "subtract" position, that is, in its rearward position shown in full lines in Fig. 2. When the subtract lever is moved to its "subtract" position it is releasably latched in this position by the hooked nose of a pivoted lever 110 (Fig. 2) which engages over a lug 111 on a pawl 112 pivoted on the link 113 actuated by lever 17. When a negative total occurs, if the operator depresses either the total or subtotal key he will find each of them locked against full depression as above described, but the partial depression of either is sufficient to release the latch 110, whereupon the subtraction lever will be snapped back to "addition" position by its spring 114. The latch 110 is released by the total and subtotal keys through connections as follows:

The latch 110 is pivoted intermediate its ends and its rear end is connected at 116 (Fig. 2) to the upper end of a vertically slidable member 117 urged upward by a spring 118. A lateral projection 119 on the member 117 is under the stem of the total key T. Pivoted at 120 to the member 117 is an arm 121 whose free end extends to a position directly under the subtotal key ST. The result is that, when either the total or subtotal key is partially depressed under the above conditions, the member 117 is pushed downward sufficiently to rock the lever 110 and release the subtraction lever.

The total and subtotal keys are then released by moving the subtraction lever rearward again to subtraction position.

Referring to Fig. 12, it will be observed that the slidable link 94 carries a pivoted dog 122. This dog normally occupies the position shown in Fig. 12 due to its own weight and a limiting stud 123 on one of the partition plates of the keyboard. When the slide 94 is pulled rearward, the dog 122 leaves the stud 123 and is free to swing counterclockwise by gravity. It does not immediately swing downward because, at the time the overdraft lock and signal are set, the subtraction lever 17 is in its subtract position and an upstanding lug 124 on a slide 125 controlled by the subtraction lever is under the dog, as shown in dot and dash lines in Fig. 12. However, when the subtraction lever is released and it automatically moves to "addition" position, this lug moves out from under the dog 122 and the dog then moves to the position shown in Fig. 13. Then, when the subtraction lever is moved rearward again to a "subtraction" position, the end of the slide 125 engages the end of the dog and moves the link 94 rearwardly still further than it was moved by the overdraft, that is, to its Fig. 14 position. The lateral lugs 95 and 96 are thereby moved out of the slots in the stems of the total and subtotal keys and the latter are free for full depression.

Conditioning machine for transfer of overdraft to negative total register

After the total and subtotal keys are released, either of them may be fully depressed to condition the machine to transfer the overdraft to the negative total register and to take the true negative total.

This conditioning is controlled largely by the "control plate" 46 shown in Fig. 1. During normal operations when there is no negative total in the machine, this plate does not move, but, when the negative total lock is set, certain parts are conditioned so that, upon depression of the total or subtotal key, the plate is moved rearwardly.

Referring to Figs. 1 and 2, the lower end of lever 91 has a lateral lug 130 on it which is normally positioned as shown in Fig. 1 where it is under the left hand end of a pawl 131 pivoted at 132 to the negative total control plate 46 and urged counterclockwise by a spring 133, the lug 130 limiting downward movement of the pawl. The latch 110, which is connected to the member 117 that is movable downward by depression of the total and subtotal keys has a stud 134 on its rear end (Fig. 1) operating in the bifurcated end of a pivoted member 135 having a downwardly extending arm 136 with a lateral lug 137 on its lower end adapted to engage under the edge of the pawl 131. When either the total or subtotal key is depressed the member 117, together with the latch 110, is moved downward which rocks the member 135 counterclockwise, but, as long as the lever 91 is in the position of Fig. 1, the pawl 131 moves downward only a short distance because of the lug 130 on arm 91. However, when a negative total occurs and the link 90 is moved rearward by arm 78, the arm 91 is swung clockwise, and the lug 130 is moved out of the path of the end of the pawl 131. With this condition existing, if the total or subtotal key is depressed after the negative total lock has been set and released, the member 135—136 will be swung counterclockwise and, as the lug 137 gets under a notch 138 in pawl 131, said pawl will move downward into latching engagement with the lug 137 with the result that, the depression of the total or subtotal key moves the control plate 46 rearward.

When the plate 46 moves rearwardly it carries with it a latch 140 having a shoulder 141 that moves over a stationary stud 142 (Fig. 3), the latch 140 being urged clockwise by the spring 133. The latch 140 thus latches the control plate in its rearward position. When the subtraction lever 17 is moved rearward to subtract position to release the total or subtotal keys as previously described, the long link 113 connected to it is moved rearwardly. Toward the rear end of this link 113 there is connected a pivoted arm 143 (Fig. 2), one of whose functions is to support the rear end of the link 113, said link 113 having a lateral lug 146 on one of its rearward projections. When the latch 140 for the control plate 46 moves down to its Fig. 3 position, the rear end of this latch 140 moves in front of the lateral lug 146 and thereby locks the subtraction lever 17 in its subtract position, as shown in Fig. 3, where it is held during the taking of a negative total.

Rearward movement of control plate 46 also latches the negative total register to the main pitman 16 so that, when said pitman is operated, the negative total register will be rocked to appropriate position. The negative total register is controlled by a link 43 (Fig. 2) which may be hooked over a stud 42 on the operating arm for the negative total register. The link 43 has a tail piece 47 (Fig. 2) adapted to be engaged by the stud 45 on the inner side of the control plate 46. When the control plate is moved rearwardly the stud 45 moves from its Fig. 2 to its Fig. 3 position and cams the link 43 counterclockwise to engage it over the stud 42.

Provision is also made for locking either the total or subtotal key in fully depressed position while the negative total is being taken and, at the same time, the undepressed one of these keys is locked against depression.

Referring to Fig. 3, a sliding lock plate 150 is mounted on the keyboard. This plate has projections 151 and 152 operating in slots in the stems of the total and subtotal keys, respectively. The plate is urged forward by a spring 153 but is normally held rearward, as shown in Fig. 1, by means of one arm 154 of a pivoted yoke having another arm 155 connected by a link 156 to the control plate 46. When the control plate 46 is moved rearward as above described, the yoke 155—154 is rocked counterclockwise which releases the slide 150 to permit it to move forward to the position of Fig. 3 under tension of spring 153 where it locks the depressed key down and prevents depression of the undepressed key.

"Fugitive 1"

The rearward movement of the control plate 46 also acts to insert the "fugitive 1" in the regular register by moving the units order pinion one step. Inasmuch as this control plate is moved rearward by the manual depression of the total or subtotal key, the "fugitive 1" is inserted manually in the present machine by depression of either the total or subtotal keys under the control of the negative total lock.

Referring to Fig. 8, the control plate 46 has a rearward extension 160. Pivoted to the outer end of this extension is a passby pawl 161 urged clockwise by a spring 162, the pawl having a lateral lug 163 seating against the lower edge of the extension 160 so as to limit the action of the spring. The pawl also has a central downwardly extending arm 164 having a lateral lug 165 adapted to engage the inclined nose 166 on one arm of a pivoted yoke 167 having another arm 168 extending downward and controlling the transfer mechanism for the units order pinion. A transfer mechanism is provided in the units order in this case, said mechanism being like that described in Patent No. 1,767,764.

When the control plate 46 moves rearwardly the lug 165 cams the arm 166 and rocks yoke 167 clockwise thereby releasing the transfer mechanism in the units order to permit a "1" to be subtracted to the units order pinion, the register being in engagement with the transfer segments. When the control plate is returned forward to normal, as will be later described, the passby pawl 161 yields and passes over the nose 166, the transfer mechanism for the units order and the yoke 167 with its arms 168 and 166 being restored to normal by the usual restoring bail of the transfer mechanism.

Restoring transfer mechanism before taking negative total

The last calculation in the regular register prior to the taking of a negative total may cause a transfer to occur in the transfer mechanism. This can happen no matter whether the last calculation is addition or subtraction. As previously mentioned, the "fugitive 1" is inserted in the register by depression of the total or subtotal key in connection with the taking of a negative total. If the transfer mechanism is not in restored condition when the "fugitive 1" is inserted, an error is liable to occur. Accordingly, provision must be made for restoring the transfer segments prior to the time that the "fugitive 1" is inserted. This result is accomplished in the present machine by means of the subtraction lever which, as will be recalled, is moved to subtraction position in order to release the total and subtotal keys prior to the taking of a negative total.

Referring to Fig. 2, it will be recalled that the subtraction lever 17 is connected to a long link 113 which is connected intermediate its length to a pivoted lever 143. The rear end of link 113 is irregular-shaped and it has an upwardly and rearwardly extending branch 170 carrying a roller stud 171 adapted to engage an inclined lateral lug 172 on the end of an arm 173 pivoted loosely on a shaft 174. Fixed to the shaft 174 is another arm 175 having an offset lug extending under the edge of arm 173. A spring 176 connects the loosely pivoted arm 173 to the fixed arm 175 so that, when link 113 returns forward, the loose arm 173 will yield when stud 171 passes under lateral lug 172.

Referring now to Fig. 4, the shaft 174, which extends through the machine, supports two arms 177 and 178 that in turn support a bail 179. The arm 178 has a cam 180 identical with the cam 181 which is rocked to engage and disengage the register 14 with the actuator racks. The cam 180 also acts to engage and disengage the register 14 with the actuator racks for reasons that will presently appear.

The arms 177 and 178 which support the bail 179 are securely fastened to the cross shaft 174 so that when the shaft 174 is rocked counterclockwise, by means to be described later, the bail 179 will be moved downwardly to restore any transfer pawls that may have been tripped in an adding operation.

The above described parts operate as follows:

When the subtraction lever 17 is moved to subtraction position for the purpose of releasing the total and subtotal keys as previously explained, the link 113 is moved rearwardly. This causes the roller stud 171 to engage the top side of the inclined lug 172 and rock the arm 173 counterclockwise. This counterclockwise movement is transmitted to the shaft 174 by the arm 173 engaging the lug on arm 175. Movement of shaft 174 causes the arms 177 and 178, together with the bail 179 to be moved downwardly to restore any transfer segments that were tripped in an adding operation. Just prior to the restoring of these segments, the downward movement of the arm 178 with its cam 180 cams the register 14 out of engagement with the transfer segments and into engagement with the actuator racks so that the transfer segments are free to be restored independently of the register.

As the subtraction lever moves to its full subtraction position, the roller stud 171 passes to the rear of lug 172 and releases the arm 173 whereupon the parts are restored to their original position by the spring 185 shown in Fig. 4. The yielding connection between the arms 173 and 175 enables the forward movement of the subtraction lever to take place without disturbing the above mechanism, as the arm 173 may be moved clockwise without transmitting movement to the arm 175.

The transfer segments are thus restored prior to the insertion of the "fugitive 1" by depression of the total key. It is entirely possible that the insertion of the "fugitive 1" would cause certain transfers but it is not necessary to restore the transfer segments again before taking a negative total because the segments do not have to be in restored position while a total is being taken from the regular register and transferred to the negative total register.

The movement of the subtraction lever from addition to subtraction position and vice versa, automatically conditions the transfer mechanism to borrow or carry in accordance with the condition of the machine and in the same general way as is described in said Horton Patent No. 1,767,674. A slight modification has, however, been made in the present machine which will now be described.

Referring to Fig. 4 the transfer mechanism is conditioned for addition or subtraction by swinging the members 190 on their pivots 191 by means of a bail 192 which may be moved to the left as viewed in Fig. 4 and returned to the right. Referring to Fig. 2 the irregular shaped rear end of link 113 is provided with a bifurcated extension 193 engaging over a stud 194 on a lever 195 pivoted on one of the side plates of the machine. The lower end of this lever is yieldingly connected to a slide plate 196 by means of two springs 197, the slide plate being connected to the bail 192. When the subtraction lever is moved, the slide plate 196 is moved and the transfer mechanism is automatically conditioned in accordance with the condition of the machine.

*Non-print during first machine operation in taking negative total*

During the first totaling operation which effects a transfer of the total in the regular register to the negative total register, it is not desired to print the total and hence mechanism is provided for automatically disabling the printing mechanism during this operation.

Referring to Fig. 8, a link 200 is pivoted to the arm of yoke 167 that has the nose 166 on it, which arm, it will be recalled, is rocked by rearward movement of control plate 46. The upper end of this link is pivoted to one arm 201 of a pivoted bell crank lever whose other arm 202 extends upwardly and is positioned against the edge of an auxiliary non-print controlling lever 203. When the arm 166 is moved upward by the rearward movement of the control plate 46, the link 200 is thrust upward which rocks the bell crank lever 201—202 counter clockwise thereby rocking the non-print lever 203 so as to move it to non-print position against the tension of the spring 24 (Fig. 5). This spring urges the mechanism to printing position and, as soon as the link 200 is released, the printing mechanism moves back to printing condition automatically. Although the non-print mechanism above described is disabled only momentarily, the parts are timed so that no printing occurs during the operation of the machine in which the printing mechanism is momentarily disabled. This is due to the fact that the shaft 37 must be rocked in order to operate the printing mechanism and, when the parts are conditioned as above described, the arm 25 passes the end of shaft 27 and does not pick it up, nor can it pick it up even though the non-print mechanism be released. The operation of these parts is described in detail in Horton Patent No. 1,730,147.

*Transfer of total to negative total register*

The description has now progressed to where the total key is depressed and the subtraction lever is latched in subtraction position. The movement of the subtraction lever to subtraction position has restored the transfer segments. Depression of the total key has inserted a "fugitive 1" into the regular register and connected the negative total register to the main pitman 16.

The movement of the subtraction lever to subtract position moves the link 113 rearward and swings to member 143 counterclockwise (Fig. 2). This moves a linkage mechanism 204 (Fig. 2) downwardly and rocks a pawl 205 pivoted on pitman 16 into the path of stud 206 on a plate 207 that is oscillated at each operation of the machine. At the same time an arm 208 pivoted to the main pitman 16 is moved down until its hooked end is in the path of a stud 209 on plate 207. With the parts positioned as just explained, at the beginning of the forward stroke of the machine, when the plate 207 rocks counter clockwise, stud 206 engages the end of pawl 205 and moves the pitman 16 to the rear to rock both the regular register and the negative total register into engagement with the actuator racks. Near the end of the forward stroke, the stud 209 engages the hooked end of the member 208 and pulls the main pitman 16 forward again to rock both of the above-mentioned registers out of engagement with the actuator racks.

During this operation, the actuator racks rise to differential positions determined by the total in the regular register 14 and this amount is transferred to the negative total register by a clockwise rotation of the pinions of the latter. In the example assumed, the amount in the regular register is 999999888 which is the complement of the true negative total. Transferring this amount to the negative total register, and remembering that the negative total pinions are of 9 digit capacity only, the negative total pinions will be moved to zero in all orders except the first three and in these orders the pinions will be moved to "8" positions which are one step short of their "0" positions.

When the subtotal key, instead of the total key, is depressed under the negative total conditions described, the operation of the machine is the same up to the point to which it has been described. The subtotal key normally controls the operation of the main pitman but, as already described, in negative total taking, the subtraction lever has already positioned the parts controlling the main pitman.

When the total in the regular register is transferred to the negative total register, the regular register is cleared, no matter whether the total or the subtotal key is depressed, because, in either case, the regular register is rocked into engagement with the actuator racks at the beginning of the forward stroke and out of engagement with them at the end of the forward stroke of the machine. No printing takes place in either case.

Obtaining true negative total from negative total register

The true negative total is printed on the second operation of the machine with the parts conditioned as above described, that is, with the total key depressed and the subtract lever locked in subtraction position.

At the beginning of the forward stroke during the second operation of the machine, the main pitman 16 is moved rearwardly and the negative total register is moved into engagement with the actuator racks. If the total key and not the subtotal key is depressed, the regular register is not rocked into engagement with the actuator racks at this time as will be later described.

After the negative total register is rocked into engagement with the racks, the racks are released and they ascend under the control of said register, that is, until the negative total register pinions are stopped in their "0" positions by the pawls 50. In the example assumed, the actuator racks in the units, tens and hundreds orders should be free to move one step because the pinions in these orders are free to move one step before they engage the pawls 50. Accordingly, the racks will rise one step and the type bars will be moved one step so that the printing mechanism will, in the example assumed, print "111" which is the correct negative total.

At the beginning of the return stroke of the machine the negative total register is rocked out of engagement with the racks which thereupon descend to their normal positions.

When a negative total as distinguished from a subtotal is being taken as above described, the regular register is not rocked into engagement with the actuator racks during the second operation above described because of the following mechanisms.

It will be remembered that, during the operation described the subtract lever is in subtraction position and the total key is depressed. Normally, if the subtract lever is in subtraction position and the machine is operated, the regular register is rocked into engagement with the actuator racks prior to their ascent and is then rocked out of engagement with them prior to their descent and, during this operation, the transfer mechanism for the register will effect whatever transfers are necessary. Also, normally, if the total key is depressed and the machine operated, the regular register will be rocked into engagement with the actuator racks prior to their ascent and rocked out of engagement with them prior to their descent but, in this case, the transfer mechanism will not effect transfers. Instead, it acts to arrest the register pinions in "0" position to enable a total to be taken. It will be obvious that, if it is desired to maintain the regular register clear, it is not desirable to rock it into engagement with the actuator racks during the second operation above described and hence some provision must be made to prevent either the subtraction lever or the total key from conditioning the parts so as to effect such rocking. This is accomplished for both of these controlling parts by disconnecting the main pitman from the regular register controlling devices.

Referring to Fig. 2, the main pitman 16 is connected to the operating arm for the regular register by means of a link 210 pivoted at 44 and urged clockwise by a spring 211. The rear end of this link has a relatively long hooked end 212 and a shallow slot 213 which normally seats over a stud 214 on the arm 215 that controls a cam for rocking the regular register into and out of engagement with the actuator racks. Pivoted to one of the side plates of the machine (Fig. 2) is a bell crank 216 urged counterclockwise by a spring 217. This lever carries a stud 218 adapted to engage the lower edge of the link 210. Normally, this bell crank is held in inactive position by means of a stud 219 on the control plate 46 as shown, for example, in Fig. 2. However, when the control plate is moved to the rear, the stud 219 moves away from the bell crank and frees it so that the spring 217 is free to swing the bell crank counterclockwise to raise the link 210. Such raising action must occur against the tension of spring 211 and takes place as follows:

The stud 219 on plate 46 (Fig. 2) moves rearwardly when the total key is depressed and this frees the bell crank lever 216 so that the spring 217 may act upon it. This spring is relatively light and cannot raise the link 210 against the tension of the spring 211. At the beginning the forward stroke of the machine during the first operation after depression of the total key, the main pitman 16 is moved rearwardly and this carries the link 210 rearwardly. The pitman 16 moves rearwardly, in a substantially horizontal line and this carries the stud 44, on which link 210 is pivoted, rearwardly in a horizontal line. The link 210 is urged clockwise by spring 211, but cannot move any farther clockwise than its Fig. 2 position because the rear end of the link is engaged over the stud 214.

It will be apparent that, as the pitman 16 moves rearwardly, the link 210 moves away from the stud 218 on the bell crank lever 216. The bell crank lever 216 is freed for movement under the influence of its spring 217 and it moves to a position such that its upper arm is in a substantially vertical position, the counterclockwise movement of the bell crank lever 216 being limited to the stud 219.

Accordingly, at the end of the first forward stroke, the link 210 is still in engagement with the stud 214, but the bell crank 216 has been moved counterclockwise so that its upper arm is in a vertical position.

Upon the return movement of the pitman 16 the stud 218 on the vertically positioned arm of bell crank lever 216 acts as a cam to raise the link 210 against the tension of the spring 211. The tension of spring 211 is overcome because the bell crank lever 216 is in such a position that it forms a rigid abutment over which the edge of the link 210 moves. The link 210 is thus cammed upwardly sufficient to disengage its rear end from the stud 214, but not far enough to move the long hooked end 212 above the stud 214. The hooked end 212 pulls the register out of engagement with the actuator racks during the return stroke.

At the beginning of the forward stroke of the second machine operation, which is a stroke during which the negative total register is rocked into engagement with the actuator racks, the link 210 is held upwardly in position where it is disengaged from the stud 214. As the pitman 16 moves rearwardly the link 210 moves past stud 214 and the register controlled by this stud is not rocked into engagement with the actuator racks. Instead the edge of the link 210 rides over and on the stud 214. Accordingly, the regular register remains out of engagement with the actuator racks and is wholly inactive during the second operation of the machine in the taking of a negative total.

During the return stroke of the pitman 16 of the second operation of the machine, the plate carrying the stud 219 is moved forwardly again and stud 219 moves the bell crank lever 216 clockwise so as to release the link 210 whereupon the parts move to their original positions.

During a subtotaling operation, however, it is desirable to have the regular register rocked into engagement with the actuator racks so that the negative total may be retransferred to the regular register. Provision is made for accomplishing this as follows:

The lever 220 (Fig. 2) which is rocked counterclockwise by depression of the subtotal key ST, is provided with a long tail 221 adapted to engage the stud 218 on the bell crank 216. Accordingly, when the subtotal key is depressed, the bell crank 216 is disabled and it does not disconnect the link 210 from the stud 214 as above described. This means that, during the second operation of the machine, and at the beginning of the forward stroke, the regular register will be rocked into engagement with the actuator racks.

When the actuator racks ascend under these conditions it is desired that they be under the control of the pinions of the negative total register and not under the control of the pinions of the regular register. This means that the transfer mechanism for the regular register must be placed in condition to effect transfers and not be placed in a condition such that it will arrest the pinions of the regular register in "0" positions. If it were in the latter condition the actuator racks would not rise at all because the regular register was cleared during the first operation.

Referring to Fig. 2, it will be recalled that depression of either the total key T or the subtotal key ST results in the downward movement of the member 117. The lower end of this member is connected to one arm of a pivoted yoke 222 having a rearwardly extending arm carrying a stud 223 positioned under the edge of a pivoted arm 224 having a shoulder 225. When the total or subtotal key is depressed, the yoke 222 swings arm 224 up far enough to cause the shoulder 225 to be positioned in the path of a stud 226 on an arm fixed to the shaft 86 as in Fig. 3. This shaft 86 (Figs. 4 and 10) is the one that locks the transfer pawls so that they will limit their pinions in "0" positions during totaling, the details being described in Patent No. 1,767,674 where the shaft is numbered 127. The pivoted arm 224 moves back and forth with the stud 214 which is reciprocated during movements of the main pitman 16. When the total or subtotal key is depressed, the arm 224 is swung upwardly clockwise and, then, at the beginning of the forward stroke, when the link 210 moves rearwardly, the shoulder 225 engages stud 226 to rock the shaft 86 to move it to a position to arrest the register pinions at "0" which is a necessary condition during the first machine operation because a total is taken from the regular register and transferred to the negative total register.

Although the action during the first machine operation is the same when the subtotal key is depressed as when the total key is depressed, provision is made for changing the controls during the second operation of the machine in negative subtotal taking.

A pass-by pawl 230 (Fig. 2) is pivoted on the stud 120 on the member 117. This pawl has a lateral lug 231 engaging the rear side edge of the member 121 that is pivoted on 117 and which is moved downward by depression of the subtotal key ST. The other end of the pawl 230 projects into the path of the stud 209 which moves counterclockwise and is then returned clockwise at each operation of the machine. During the first machine operation in negative subtotal taking, the stud 209 passes the pawl 230 and the control of the transfer segments by depression of the subtotal key is not disturbed. But, during the return stroke, of the first operation of the machine, the stud 209 engages the pawl 230 and causes it to rock the member 121 counterclockwise so as to remove the end of said member from under the stem of the subtotal key ST. This frees the assembly including the member 117 and it rises under the action of its spring 118 to rock the yoke 222 clockwise and lower the lever 224 by gravity so it is out of the path of the stud 226.

Accordingly, during the second operation of the machine in negative subtotal taking, the shaft 86 is not rocked and hence the register pinions are not arrested in their "0" positions. Instead the transfer mechanism is free to effect transfers.

It is to be observed that, when the negative total is transferred back to the regular register, it is subtracted from said register. In the example assumed, "111" is subtracted from the regular register which would leave the pinions in the condition 999 999 889, which is the same condition as when the overdraft first occurred.

In order that the above described mechanism may not interfere with normal operations of the machine with the subtraction lever in addition position, the link 113 is provided with a plate 232 that is positioned under a stud 234 on the pawl 230 when the subtraction lever is in addition position. With the parts in this position, if either the total or subtotal key is depressed, the stud 234 engages the plate 232 and the pawl 230 is disabled.

Restoring mechanism

Provisions have been made, as already described, for locking certain of the parts of the machine in position while the machine is given two strokes of operation. However, after the machine has been given these two strokes, it is necessary to restore it to normal condition and, in order that this may be accomplished, the following construction has been provided:

The control plate 46 is urged to the left by a spring 240 (Fig. 1) but it is held in its rear position by the lever 140 as shown in Fig. 3. It is first necessary to release the control plate in order to restore the parts to normal.

For this purpose there is provided a slide 241 (Fig. 1) having a U-shaped portion at its front end positioned about the stud 206 that oscillates with the main drive shaft 11 of the machine. The rear end of this slide 241 carries a pivoted pawl 242 urged counterclockwise by a spring 243. This pawl has a shoulder 244 adapted to engage at different times with two spaced projections 245 and 246 on a member 247 pivoted to control plate 46. The pawl 242 is normally held out of the path of said projections by a stud 248 on an arm 249 pivoted at 250 and connected with the control plate 46 by a link 251. When the control plate 46 is moved rearwardly prior to the first machine operation in negative total taking, the arm 249 is swung from its Fig. 1 position to its Fig. 3 position by a lug 251 and this releases the pawl 242 which is thereupon moved counterclockwise to its Fig. 3 position by the spring 243. During the latter part of the forward stroke of the first machine operation in negative total taking, the stud 206 engages the rear side of the U on the forward end of slide 241 and moves the slide rearwardly a slight distance, the movement being such that the shoulder 244 on the pawl 242 moves behind the first projection 245 on member 247. During the latter part of the return stroke of the same machine operation, the stud 206 strikes the opposite side of the U on slide 241 and moves the slide forward again. The pawl 244 being then in engagement with the lug 245 on member 247 moves member 247 forward a slight distance. The member 247 is pivoted on one arm of an irregular shaped member 252 pivoted on the control plate 46. The upper arm of this member 252 carries a stud 253 adapted to engage the notched under edge of a detent 254 urged clockwise by a spring 255. The forward movement of member 247 just described is enough to rock the member 252 clockwise enough to move the stud 253 from the notch in which it is shown in Fig. 3 to the notch to the rear of it. The detent 254 holds the member 252 in the position to which it has been moved which means that the lugs 245 and 246 are held forward slightly further than the position shown in Fig. 3. The member 247 has studs on it operating in slots in the control plate 46 (Fig. 1) and its pivotal connection to member 252 is a pin and slot connection. This insures that lugs 245 and 246 move in a horizontal plane.

On the second operation of the machine in negative total taking the slide 241 is again moved rearwardly and, this time, the shoulder 244 on the pawl 242 engages behind the rear lug 246 on member 247, the stud 253 being at this time engaged by the rear notch of detent 254. Now, when the slide 241 is moved forward again at the end of the return stroke of the second machine operation, the member 247 is moved still further forward and member 252 is rocked further in a clockwise direction. The rocking movement of member 252 is enough to cause stud 253 to cam the detent 254 upward considerably. The rear end of this detent carries a stud 256 that engages under a projection 257 (Fig. 3) on the latch 140 so as to raise the latch clear of the stud 142 to release the control plate 46. The member 252 also has a forwardly extending arm 258 having a lateral lug which, upon the second movement of the member 252 just described, engages under the lower edge of the pawl 131 and raises the pawl out of engagement with the lug 137 on arm 136. The control plate 46 is thus entirely released and it moves forward again under the action of its spring 240.

The forward movement of the control plate 46 also releases the total and subtotal keys. When the control plate moves forward, the link 156 moves forward and the yoke 155—154 is rocked clockwise. The lug on the upper arm 154 engages the projection on slide 150 and moves the slide rearwardly to release the total and subtotal keys.

The subtract lever 17 is also released at the time the control plate is released because the subtract lever was being held by the latch 140 which was released to release the control plate.

When the subtract lever restores to addition position, it acts to place a tension on the spring 145 to restore the negative total locking mechanism to normal. Referring to Fig. 2 it will be observed that the irregular shaped rear end of the link 113 has a long upwardly extending arm to which the spring 145 is connected. When the subtract lever moves from the full line position of Fig. 2 to the dot and dash position of said figure link 113 moves forward and tensions the spring 145. Inasmuch as the negative total lock, the negative total signal, and the operating mechanism therefor are released by the clearing of the register in a totaling operation, these parts are free to be returned to normal by spring 145 and the other springs associated with said parts. In the event, however, that the negative total is transferred back to the regular register through use of the subtotal instead of the total key, the regular register again goes to a negative total condition and the negative total signal and lock remain in position.

The pawls 50 of the negative total register are reset as follows:

Referring to Fig. 5, each time the machine is operated, the yoke 21 is rocked clockwise and then returned counterclockwise. This yoke rocks the shaft 27 in the same manner during each operation of the machine, the shaft being carried by the pivoted arm 28. The only time that the shaft 27 is not rocked is when the printing mechanism is disabled. It will be recalled that the printing mechanism is disabled during the first machine operation in negative total taking, but not during the second. In other words, the shaft 27 and arm 28 are first rocked clockwise and then returned counterclockwise during every operation of the machine except when the printing mechanism is disabled, and such disablement occurs during the first operation of the machine in negative total taking but not the second.

Referring now to Fig. 4, it will be observed that the arm 28 carrying the shaft 27 has a rearward extension 260 on which is pivoted a pawl 261 urged counterclockwise by a spring 262. This pawl has a hooked portion 263 adapted to engage under a stud 264 and the pawl also has a tail 265 adapted to engage a stationary shaft 266. The stud 264 is carried by an arm 267 fixed to a shaft 268. This shaft carries two other arms 269 and these two arms carry a bail 270 adapted to engage the tails of the pawls 50. During normal operations of the machine, when, upon the forward stroke of the machine, the shaft 27 is moved clockwise, the rear end 260 of the arm 28 moves down and the pawl 261 hooks over the stud 264. Then, upon the return stroke of the machine, the pawl moves upwardly and moves the bail 270 counterclockwise in a direction to restore the pawls 50. Near the end of the return stroke of the machine the tail 265 of the pawl 261 engages the shaft 266 and the pawl is disengaged from the stud 264.

It will be recalled that, at the beginning of the first operation in negative total taking, the pawls 50 are automatically released by movement of the pinions 30. It is not desired to restore these pawls until after the second machine operation in negative totaling and such restoration does not occur because, as previously explained, the printing mechanism is automatically disabled during the first operation in total taking and hence the shaft 27 is not rocked so that the pawl 261 remains inactive. Upon the second machine operation, however, the shaft 27 is rocked because this is a printing operation and the pawl 261 becomes active to restore the pawls 50 during the return stroke of the second machine operation and after the pinions 30 have indexed the actuator racks and type bars to print a true negative total.

Operation

While the operation of the machine has been explained as the description has proceeded, it can be visualized more clearly if it is briefly summarized.

When a negative total or overdraft occurs in the regular register, the overdraft signal OD is automatically displayed and both the total and the subtotal keys are locked against full depression. If the operator is not interested in taking a total immediately but desires to enter further items, he may do so and, if it should happen that the positive value of these items is enough to cancel the negative total, the regular register will be automatically put in positive condition and the overdraft signal and overdraft lock will be released so as to put the machine in normal condition.

On the other hand if, after a negative total occurs, the operator desires to take a total his first action is to attempt to depress either the total or the subtotal keys. If he has observed the overdraft signal he will know that the regular register is in overdraft condition. If he does not observe this signal, he will be notified of the overdraft by finding that he cannot fully depress either the total or the subtotal key. He is, therefore, really notified of an overdraft condition in two ways, namely, first, by the overdraft signal, and second, by the locked total and subtotal keys.

Knowing that a negative total exists, the operator then pushes the subtract lever to subtraction position, said subtract lever having automatically moved to add position when the total or subtotal key was partially depressed, if said subtract lever was in subtract position when said key was depressed. He then depresses the total or subtotal key, and gives the machine two strokes of operation whereupon the correct negative total will be automatically printed and the machine restored to normal condition.

The movement of the subtract lever back to subtract position under the above conditions removed the obstruction from beneath both the total and the subtotal keys and restored the transfer pawls of the transfer mechanism. The subtract lever is automatically locked in subtract position after the total or subtotal key is depressed so that it remains in this position for the two strokes of operation in negative total taking but it is automatically released after that.

Depression of the total key moves the control plate 46 rearward which automatically locks the total and subtotal keys in position; automatically inserts the "fugitive 1" into the regular register; automatically hooks the negative total register to the main pitman of the machine; automatically conditions some of the controls for total taking, other controls having been conditioned by rearward movement of the subtraction lever; and automatically disables the printing mechanism so that no printing will occur during the first operation, but will occur during the second operation. In addition this control plate conditions certain devices so that the regular register will not be rocked into engagement with the actuator racks during the second machine operation of the negative totaling operation, and other parts so that the machine will be properly released to normal after two operations.

During the first of the two machine operations above described, the negative total on the regular register, which is, in fact, the complement of the true total, is automatically transferred to the negative total register in a subtraction direction and the regular register is cleared. During the second operation, a total is taken from the negative total register, the regular register remaining undisturbed, and the total is printed. This total is the true negative total because of the "9" tooth pinion construction of the negative total register.

In the example assumed, that is, subtracting 888 from 777, the negative total condition of the regular register is 999 999 889. When the machine is conditioned for the taking of a negative total, the "fugitive 1" is inserted leaving the pinions in the position 999 999 888. During the first machine operation this amount is transferred to the negative total register in a subtract direction. On account of the nine teeth in the pinions of the negative total register all the pinions except those in the first three orders will be moved to "0" and those in the first three orders will be moved to an "888" position, but, since the pinions have only nine teeth, this means that the pinions in these three orders are all one step from their arresting pawls. Accordingly, when a total is taken from the negative total register, these three pinions will each move one step so that the type bars corresponding to them will print "111" which is the true negative total.

If it is desired to take a subtotal instead of a total, the subtotal key is depressed and the machine operated as above described. All the operations are the same except that during the last machine operation, that is, while the negative total is being printed, the regular register is brought into engagement with the actuator racks so that as the true negative total, that is, "111" is taken, this amount is subtracted from the regular register which puts the pinions of the regular register in the condition 999 999 889, thereby leaving them in the condition in which they were prior to the taking of the true negative total.

It is to be understood that the construction shown is for purposes of illustration and that variations may be made in it without departing from the spirit and scope of the invention as defined by the appended claims. This is particularly true of the details of the controls for conditioning the various parts of the machine. These can be varied as long as proper provision is made for transferring the complement of the negative total to the negative total register with its nine tooth pinions, and then taking a total from the latter register.

What is claimed is:

1. A calculating machine having a register from which items may be subtracted as well as added whereby said register may reach a negative condition in which it contains the complement of a negative total, a transfer mechanism for said register, means for inserting a "fugitive 1" in said register to place the same in correct numerical condition, a negative total mechanism independent of said register, and means for transferring the complement in said register to said negative total mechanism and for then taking a total directly from said negative total mechanism to thereby obtain the true negative total.

2. A calculating machine having a register from which items may be subtracted as well as added whereby said register may reach a negative condition in which it contains the complement of a negative total, a transfer mechanism for said register, means for inserting a "fugitive 1" in said register to place the same in correct numerical condition, a total taking means, a printing mechanism normally controlled by said register in printing totals, a negative total mechanism independent of said register adapted to receive said complement from said register, and means conditioned by said total taking means, when the latter is conditioned for total taking after a negative total occurs, for causing said machine, when operated, to transfer the complement in said register to said negative total mechanism while blocking said printing mechanism and to then cause said printing mechanism to be operated under the control of said negative total mechanism to thereby print a true negative total.

3. A calculating machine having a register from which items may be subtracted as well as added whereby said register may reach a negative condition in which it contains the complement of a negative total, a transfer mechanism for said register, means for inserting a "fugitive 1" in said register to place the same in correct numerical condition, a printing mechanism normally controlled by said register in printing totals, a negative total mechanism independent of said register adapted to receive said complement from said register, and conditioning means for conditioning the machine to cause it, when operated, to transfer the complement in said register to said negative total mechanism and clear said register and to then cause said printing mechanism under the control of said negative total mechanism to thereby print a true negative total and, at the same time, to transfer said complement back to said register.

4. A calculating machine having a register from which items may be subtracted as well as added whereby said register may reach a negative condition in which it contains the complement of a negative total, a transfer mechanism for said register, means for inserting a "fugitive 1" in said register to place the same in correct numerical condition, a printing mechanism normally controlled by said register in printing totals, a negative total mechanism independent of said register adapted to receive said complement from said register, a total taking means, a negative total lock for locking said total taking means when said register goes negative, means for releasing said locked total taking means, and means conditioned by said total-taking means, when the same is conditioned for total taking after being released for causing said machine, upon being operated, to transfer the complement in said register to said negative total mechanism and to then cause said printing mechanism to be operated under the control of said negative total mechanism to print a true negative total.

5. A calculating machine having a register from which items may be subtracted as well as added whereby said register may reach a negative condition in which it contains the complement of a negative total, a transfer mechanism for said register, means for inserting a "fugitive 1" in said register to place the same in correct numerical condition, a printing mechanism normally controlled by said register in printing totals, a negative total mechanism independent of said register adapted to receive said complement from said register, a total taking means including a total key, a negative total lock for locking said total key when said register goes negative, a subtraction lever having connections for releasing said total key, and means conditioned by depression of said total key after it has been released for causing said machine, when operated, to transfer the complement in said register to said negative total mechanism and to then cause said printing mechanism to be operated under the control of said negative total mechanism to print a true negative total.

6. A calculating machine having a register from which items may be subtracted as well as added whereby said register may reach a negative condition in which it contains the complement of a negative total, a transfer mechanism for said register, means for inserting a "fugitive 1" in said register to place the same in correct numerical condition, a printing mechanism normally controlled by said register in total taking, a negative total mechanism independent of said register, and means for conditioning said machine to enable it, upon being given two machine operations, to transfer said complement to said negative total mechanism during the first machine operation while preventing operation of said printing mechanism and to then control said printing mechanism from said negative total mechanism during the second machine operation to print a true negative total.

7. A calculating machine having a register from which items may be subtracted as well as added whereby said register may reach a negative condition in which it contains the complement of a negative total, a transfer mechanism for said register, means for inserting a "fugitive 1" in said register to place the same in correct numerical condition, a printing mechanism normally controlled by said register in total-taking, a negative total mechanism independent of said register, total taking means including a depressible total key, a negative total lock for locking said total key when said register goes negative, means for releasing said total key, and means conditioned by depression of said total key after it has been released to cause said machine, upon being given two machine operations, to transfer said complement to said negative total mechanism during the first machine operation while preventing operation of said printing mechanism and to then control said printing mechanism from said negative total mechanism during the second machine operation to print a true negative total.

8. A calculating machine having a register from which items may be subtracted as well as added whereby said register may reach a negative condition in which it contains the complement of a negative total, a transfer mechanism for said register, a printing mechanism normally controlled by said register in total taking, a negative total mechanism independent of said register, a total taking means including a total key, a negative total lock for locking said total key when said register goes negative, means for releasing said total key and restoring said transfer mechanism to normal in all orders in which it may have been tripped, and means conditioned by depression of said total key after it has been released for inserting a "fugitive 1" in said register and for conditioning the machine to cause it, when operated, to transfer said complement to said negative total mechanism while preventing operation of said printing mechanism and to then control said printing mechanism from said negative total mechanism to print a true negative total.

9. A calculating machine having a register from which items may be subtracted as well as added whereby said register may reach a negative condition in which it contains the complement of a negative total, a transfer mechanism for said register, means for inserting a "fugitive 1" in said register to place it in correct numerical condition, a negative total mechanism having a plurality of pinions whose movements are independent of one another but which pinions are provided with means for arresting them in position for total-taking, means for conditioning the machine to transfer said complement from said register to said negative total pinions to set the same, and total taking means for taking a total directly from said negative total pinions whereby a true negative total is obtained.

10. A calculating machine having a register from which items may be subtracted as well as added whereby said register may reach a negative condition in which it contains the complement of a negative total, a transfer mechanism for said register, means for inserting a "fugitive 1" in said register to place the same in correct numerical condition, a negative total mechanism having a plurality of pinions whose movements are independent of one another but which pinions are provided with means for arresting them in position for total taking, means for transferring the complement in said register to said negative total pinions during which transfer said pinions are rotated in a given direction, and means for taking a total from said pinions by rotating them in the same direction as when the complement is transferred to them.

11. A calculating machine having a register from which items may be subtracted as well as added whereby said register may reach a condition in which it contains the complement of a negative total, said register having a plurality of pinions of ten digit capacity and a transfer mechanism therefor, means for inserting a "fugitive 1" in said register to place the same in correct numerical condition, a negative total mechanism including a plurality of pinions of nine digit capacity whose movements are independent of one another but which pinions are provided with means for arresting them in position for total taking, and means for conditioning the machine to cause the complement in said register to be transferred to said negative total pinions and a total to be taken from said pinions whereby the true negative total is obtained.

12. A calculating machine having a register from which items may be subtracted as well as added whereby said register may reach a condition in which it contains the complement of a negative total, said register having a plurality of pinions of 10-digit capacity and a transfer mechanism therefor, means for inserting a "fugitive 1" in said register to place the same in correct numerical condition, a negative total mechanism including a plurality of pinions of 9-digit capacity whose movements are independent of one another, a pawl for each of said negative total pinions for arresting the same in total-taking position, said pawls being normally inactive, means for transferring the complement in said register to said negative total pinions and simultaneously rendering said pawls active, and means for then taking a total from said negative total pinions whereby a true negative total is obtained.

13. A calculating machine having a register from which items may be subtracted as well as added, whereby said register may reach a condition in which it contains the complement of a negative total, said register having a plurality of pinions of 10-digit capacity and a transfer mechanism therefor, means for inserting a "fugitive 1" in said register to place the same in correct numerical condition, a negative total mechanism including a plurality of pinions of 9-digit capacity whose movements are independent of one another, pawls for arresting said pinions in total-taking position, said pawls being normally inactive, means for conditioning said machine to cause it, when operated, to transfer the complement in said register to said negative total pinions in a given direction, means acting to automatically enable said pawls as said complement is transferred to said pinions, and means for taking a total from said negative total pinions by rotating them in the same direction as they were rotated when said complement was transferred to them, whereby a true negative total is obtained.

14. A calculating machine having a register from which items may be subtracted as well as added whereby said register may reach a condition in which it contains the complement of a negative total, said register having a plurality of pinions of 10-digit capacity and a transfer mechanism therefor, means for inserting a "fugitive 1" in said register to place the same in correct numerical condition, a negative total mechanism including a plurality of pinions of 9-digit capacity whose movements are independent of one another, pawls for arresting said negative total pinions in total-taking position, latches normally holding said pawls in inactive position, means for conditioning the machine to cause it, when operated, to transfer the complement in said register to said negative total pinions, means operating automatically as said complement is transferred to said pinions for releasing said latches, and means for taking a total from said negative total pinions whereby a true negative total is obtained.

15. A calculating machine having a register from which items may be subtracted as well as added whereby said register may reach a condition in which it contains the complement of a negative total, said register having a plurality of pinions of 10-digit capacity and a transfer mechanism therefor, means for inserting a "fugitive 1" in said register to place the same in correct numerical condition, a negative total mechanism including a plurality of pinions of 9-digit capacity whose movements are independent of one another, pawls for arresting said negative total pinions in total-taking position, latches normally holding said pawls in inactive position, means for conditioning the machine to cause it, when operated, to transfer the complement in said register to said negative total pinions, said negative total pinions having means associated with them for releasing said latches as said pinions are rotated during said transfer, and means for conditioning the machine to take a total from said negative total pinions whereby a true negative total is obtained.

16. A calculating machine having a register from which items may be subtracted as well as added whereby said register may reach a condition in which it contains the complement of a negative total, said register having a plurality of pinions of 10-digit capacity and a transfer mechanism therefor, means for inserting a "fugitive 1" in said register to place the same in correct numerical condition, a printing mechanism, a negative total mechanism including a plurality of pinions of 9-digit capacity whose movements are independent of one another, pawls for arresting said pinions in total-taking position, said pawls being normally inactive, means for conditioning said machine to cause it, when operated, to transfer the complement in said register to said negative total pinions while preventing operation of said printing mechanism, means for automatically rendering said pawls active as said complement is transferred to said negative total pinions, means for taking a total from said negative total pinions to thereby obtain a true negative total, and means controlled by said printing mechanism for restoring said pawls after a total has been taken from said negative total pinions.

17. A calculating machine having a register from which items may be subtracted as well as added whereby said register may reach a condition in which it contains the complement of a negative total, a transfer mechanism therefor, means for inserting a "fugitive 1" in said register to place the same in correct numerical condition, a total-taking means for controlling said transfer mechanism to cause the same to arrest the pinions of said register in total-taking position, a negative total mechanism including a plurality of pinions whose movements are independent of one another, pawls for arresting said negative total pinions in total-taking position, and means conditioned by said total-taking means when the latter is conditioned for total-taking after a negative total occurs, for causing said machine, when operated, to transfer the complement in said register to said negative total pinions and to clear said register and to then take a total from said negative total pinions to thereby obtain a true negative total and at the same time transfer said complement back to said register with the total-taking control of said transfer mechanism disabled so that said register will not interfere with the taking of the negative total from said negative total pinions.

KATHLEEN H. HORTON.
DETROIT TRUST COMPANY, [L. S.]
*Successor to Detroit & Security Trust Company, Executors under Will of Allen A. Horton, Deceased,*
By SELDEN B. DAUME,
    *Vice President,*
JOHN J. SPOUTZ,
    *Assistant Secretary.*